US005558399A

United States Patent [19]
Serber

[11] Patent Number: 5,558,399
[45] Date of Patent: Sep. 24, 1996

[54] SEAT AND LUMBAR MOTION CHAIR, ASSEMBLY AND METHOD

[76] Inventor: Hector Serber, 6 W. Harbor Dr., Sausalito, Calif. 94965

[21] Appl. No.: 305,026

[22] Filed: Sep. 13, 1994

[51] Int. Cl.$^6$ .............................. A47C 3/025; A47C 7/46
[52] U.S. Cl. ...................... 297/284.4; 297/216.19; 297/216.15; 297/216.1; 297/343
[58] Field of Search .................. 297/216.15, 216.19, 297/216.1, 343, 318, 317, 320

[56] References Cited

U.S. PATENT DOCUMENTS

| | | | |
|---|---|---|---|
| 2,102,979 | 12/1937 | Smith | 297/216.19 |
| 2,725,921 | 12/1955 | Markin | 297/216.15 |
| 3,556,584 | 1/1971 | Simon | 297/216.1 X |
| 4,650,249 | 3/1987 | Serber . | |
| 5,112,109 | 5/1992 | Takada et al. | 297/343 |
| 5,125,598 | 6/1992 | Fox | 297/216.15 X |
| 5,244,252 | 9/1993 | Serber | 297/216.19 |

FOREIGN PATENT DOCUMENTS 2456028  8/1976  Germany ...................... 297/216.19

Primary Examiner—Peter M. Cuomo
Assistant Examiner—Rodney B. White
Attorney, Agent, or Firm—Flehr, Hohbach, Test, Albritton & Herbert

[57] ABSTRACT

A seat and lumbar motion chair having a lumbar support assembly which is coupled to the seat and a mounting assembly mounting the seat and the lower end of the lumbar support for movement in a generally horizontal orientation in fore and aft directions. Movement of the seat is along an upwardly tilting path having a compound radius of curvature centered proximate to the mass of a person seated on the seat. The lumbar support mounting assembly is movable at two points, namely, in the fore and aft direction at the rear of the seat and pivotally at the back support. The seating apparatus further includes a back support positioned to engage the person's upper back in the thoracic region. A method including the steps of employing a seat and lumbar support assembly mounted for movement relative to the back support along a fore and aft direction to maintain contact between the person's buttocks with the seat and contact of the lower back with the lumbar support during motion of the person's body. The chair can employ a shock absorber device to control seat motion, a seat pan formed with a pelvic cradle pocket, pummel and side bolsters, a seat pan safety net, specialized seat belts, and apparatus for selective adjustment of the reclining angle between said back support and the seat.

14 Claims, 9 Drawing Sheets

5,558,399

SEAT AND LUMBAR MOTION CHAIR, ASSEMBLY AND METHOD

TECHNICAL FIELD

The present invention relates, in general, to chairs as seat assemblies for humans and it applies in general to all typical seating conditions as for example to general purpose seating, to office task seating, and to vehicular seating, for drivers, operators, and passengers, and more particularly relates to seat, back, and lumbar support assemblies which are movable in paths with centers of motion proximate to the elevation of several centers of mass of the body components such as the upper, mid, or lower body while seated, to provide function witch both safety and comfort.

Therefore, these chairs will be composed of a seat, a lumbar support, and a back support which will move in proportional relationship to each other.

The "seat and lumbar motion chair" of the present invention relates to motion and proper alignment of the skeletal components of the seated body specially of the spinal column, pelvis and femur of the human being while seated.

BACKGROUND ART

Seated motion is very important for the performance of any task and proper function of the body, as this motion is needed by the human being in action. The present invention uniquely supports and optimizes the management of three major groups of body components; a) the upper body; thoracic spine, chest, neck, head, and arms; b) the mid body; lumbar spine and abdominal area; and c) the lower body; buttock and legs and considering the most efficient alignment is the mid range of motion of the body in its relaxed posture sometimes referred to as the NASA Neutral Body Posture (NBP).

Considerable effort has been directed toward the development of chairs for enhancing the safety and comfort of seated humans. The present invention is titled "Seat and Lumbar Motion Chair, Assembly and Method". In this invention several paths of motion of the seat and lumbar support relative to the back support for both comfort and safety has been developed.

Therefore the seat assembly of the present invention will contain three uniquely linked supporting components for 1) the seat; 2) the back support; and 3) the lumbar support, with each of these components being movable in proportional relationships to each other and to the body causing such motion.

However, the need arises for motion control devices, shock absorption, special restraint systems, deformable seat pan, seat pans with pelvic cradle pockets, and deformable tracks to absorb the high loads all of which are needed to compliment and enhance, seat and lumbar motion performance, taking into consideration the needs presented as a result of this new seat and lumbar motion assemblies.

It is highly desirable, for example, in a vehicle to effect a controlled deceleration of substantially the entire mass of a passenger in several stages preferably at a rate which is lower than the deceleration rate of a vehicle, during a crash.

In addition to issues of safety, any seating assembly is desirably designed so as to be comfortable to sit in under normal conditions for prolonged periods of time. A highly effective seat assembly for enhancing comfort during prolonged seating is the assembly disclosed in my U.S. Pat. No. 4,650,249 in which the seat is mounted for movement along an upwardly concaved arcuate path. Such a path allows the user to continuously balance his or her posture while seated on the chair. The seating system of U.S. Pat. No. 4,650,249 restores mobility and eliminates deformation of the lumbar spine while seated doing task seating.

The pelvic tilt seat assembly of U.S. Pat. No. 4,650,249, however, is shown as incorporated into a seat assembly which has a torso support platform that is relatively stationary in its vertical position. Thus, when the seat moves along an arcuate path, the torso support will resist vertical torso displacement and gaps in the lumbar area caused by movement of the seat.

In addition the "Seat Assembly and Method" of my U.S. Pat. No. 5,244,252 is highly effective in eliminating lower body injury and reducing injury in general to the occupant of a vehicle during a frontal collision. In this patent and subsequent pending application continuation Ser. No. 08/119,713 of Sep. 9, 1993 provides a lumbar support which is slidable in a generally vertical orientation. It does not follow the fore and aft motion of the seat and is not pivoted to the rear of the seat. Hence, to remedy the shortcoming of this lumbar, the present invention is being applied for.

Accordingly, it is an object of the present invention to provide a seat assembly for any seating applications, which provides enhanced health, comfort and further, has enhanced safety.

It is another object of the present invention to provide a seat assembly for a vehicle which will increase the ability to control deceleration of the body of a person seated on the seat during a collision with the aid of a linked and movable seat and lumbar supports.

Another object of the present invention is to provide a seat assembly which will enhance safety in conjunction with and even when passive restraint devices are not employed and air bags or the like have not been installed in the vehicle.

Still another object of the present invention is to provide an apparatus and method for seating of individuals which is relatively simple to construct and yet provides substantially enhanced comfort and safety.

Still a further object of the present invention is to provide a safety seating assembly for a vehicle or the like which can be retrofitted to existing vehicle seat mounting structures.

It is also an object of the present invention to provide a seat assembly which is durable, reliable in its operation, relatively low in maintenance, and suitable for use in a wide range of environments.

It is also an object of the present invention to provide components needed such as; control means, locking device, mounting means, seat pan safety net, seat pans with pelvic cradle pockets, restraining safety belts, deployment device, shock absorber means, and back support with selective adjustment provisions.

The seat assembly and method of the present invention have other objects and features of advantage which will become apparent from, and are set forth in more detail in, the accompanying drawing and description of the best mode of carrying out the invention.

DISCLOSURE OF INVENTION

In one aspect, the seat and lumbar support assembly coupled to the back support of the chair of the present invention is formed to provide a chair assembly for task seating, a motor vehicle or the like. The method of the present seat and lumbar support assembly includes a seat, and a mounting assembly mounting the seat in a generally horizontal orientation for movement in fore and aft directions along an upwardly tilting path having a radius of curvature centered proximate to the mass of a human seated on the seat, such centers applied at points depending upon the use and application of the chair. Said seat, at its rear, is coupled to a movable lumbar support proximate it's bottom end. Further, said lumbar support top end is coupled to the back support. The radius of curvature of the path of seat and lumbar supports can be sufficiently small to convert a portion of the linear momentum of the person's buttocks and lower body mass into angular momentum, and can be sufficiently large to enable the seat to move and remain in front of the body to contain the person's buttocks to significantly slow the rate of deceleration of the person during stopping of the vehicle.

Second, in another aspect, the method of the seating assembly of the present invention provides enhanced comfort and includes, briefly, a seat, coupled to a lumbar support, a mounting assembly mounting the seat in a near horizontal orientation relative to a support surface. The mounting assembly also mounts the seat support for movement along a downwardly tilting path having centers of motion proximate the mass of the person seated on the seat. The seating apparatus further includes a back support positioned to engage the person's upper back in the thoracic region and coupled to said moveable lumbar support in conjunction with movement of the seat in order to follow the change in position of the seated person's lumbar region as the seat moves along the downwardly tilting path.

The method of the present invention is comprised, briefly, of the steps of employing a seat and lumbar support mounted for movement relative to the back support along a fore and aft direction to maintain contact between the person's buttocks with the seat and contact of the lower back with the lumbar support during motion of the person's body. The methods of the present invention further includes lumbar motion that can be managed by the lumbar support member which is movable between two points: the bottom of the lumbar support, coupled to the rear of the seat, and the top of the lumbar support, coupled to the peripheral frame of a typical back support:

a. In one form of construction; the motion is obtained by connecting the lumbar rest at the bottom coupled to the rear of the seat pan frame, further connecting the assembly with a pair of sliding means to the frame of the chair in a generally linear manner, and the front of the seat mounted on sliding means formed to direct it 1) upwardly curved, 2) downwardly curved or 3) a on a straight inclined plane in a manner which will cause the front of the seat to raise or decline as the rear of the seat slides forward or back respectively, the top of the lumbar support will ride on a pair of sliding means fixed to the back rest which will allow the lumbar rest to slide between positions vertically and reclined.

The motion can be centered in the torso above the lumbar of the person seated on said seat over 15" above the seat, which is above the lumbar area of most humans, in such a manner to cause free motion of the lumbar and the seat in a very stable manner since the center of gravity of the entire body is considerably below the center of motion of the chair b. In another form of construction the top edge of the lumbar support is coupled to and pivoted laterally from the peripheral frame of the back support. The bottom edge of the lumbar support is coupled to and pivoted along and/or laterally at each side to the rear of the seat. Therefore the rear of the seat will swing from the top of the back rest connection with the lumbar support centered above the seat surface.

The front of the seat will be guided down or up by a pair of front sliding means as the rear of the seat swings forward or back respectively. This front sliding means can be straight, upwardly curved or downwardly curved. This will cause points of the seat to rotate from the pivoting point at the top of the lumbar support and other centers as described by the front sliding means.

c. In an alternative construction, the center of motion of the seat and lumbar support can be proximate the mid lumbar area and further, d. In an alternative construction, the center of motion can be below the lumbar area as, for example, the femoral head joint with the pelvis which is located approximately three inches above the seat surface for most humans.

e. The above described alternative construction can employ deployment devices to control and release seat motion when the impact is over a known threshold above normal seat use.

f. The above described alternative construction can employ shock absorber means coupled to said seat and to said seat mounting means to permit displacement of said seat in a forward direction from peak deployment and to cause resilient displacement in a downward direction against said shock absorbing means when deceleration forces on said seat and said person exceed a known force threshold.

g. The above described alternative construction can employ a seat pan safety net to contain the lower body's load by deflecting into a sack shape whereby the buttock bones become anchored to said seat safety net during a vehicle collision.

h. The above described alternative construction can employ a seat pan formed with a pelvic cradle pocket, pummel and side bolsters.

i. The above described alternative construction can employ seat mounting means (deformable curved tracks) that are deformable at a known threshold to provide resilient displacement of the seat whereby impact forces on the body do not exceed the body's ability to withstand abdominal pressure and muscular skeletal stress to provide one more stage for absorbing crash energy.

j. The above described alternative construction can employ control means coupled to control movement of the seat along said arcuate path in clockwise and or counter clockwise directions.

k. The above described alternative construction can employ specialized seat belts and point of application.

l. The above described alternative construction can employ provisions for selective adjustment of the reclining angle between said back support and the seat.

BEST MODE OF CARRYING OUT THE INVENTION

Figure 1:
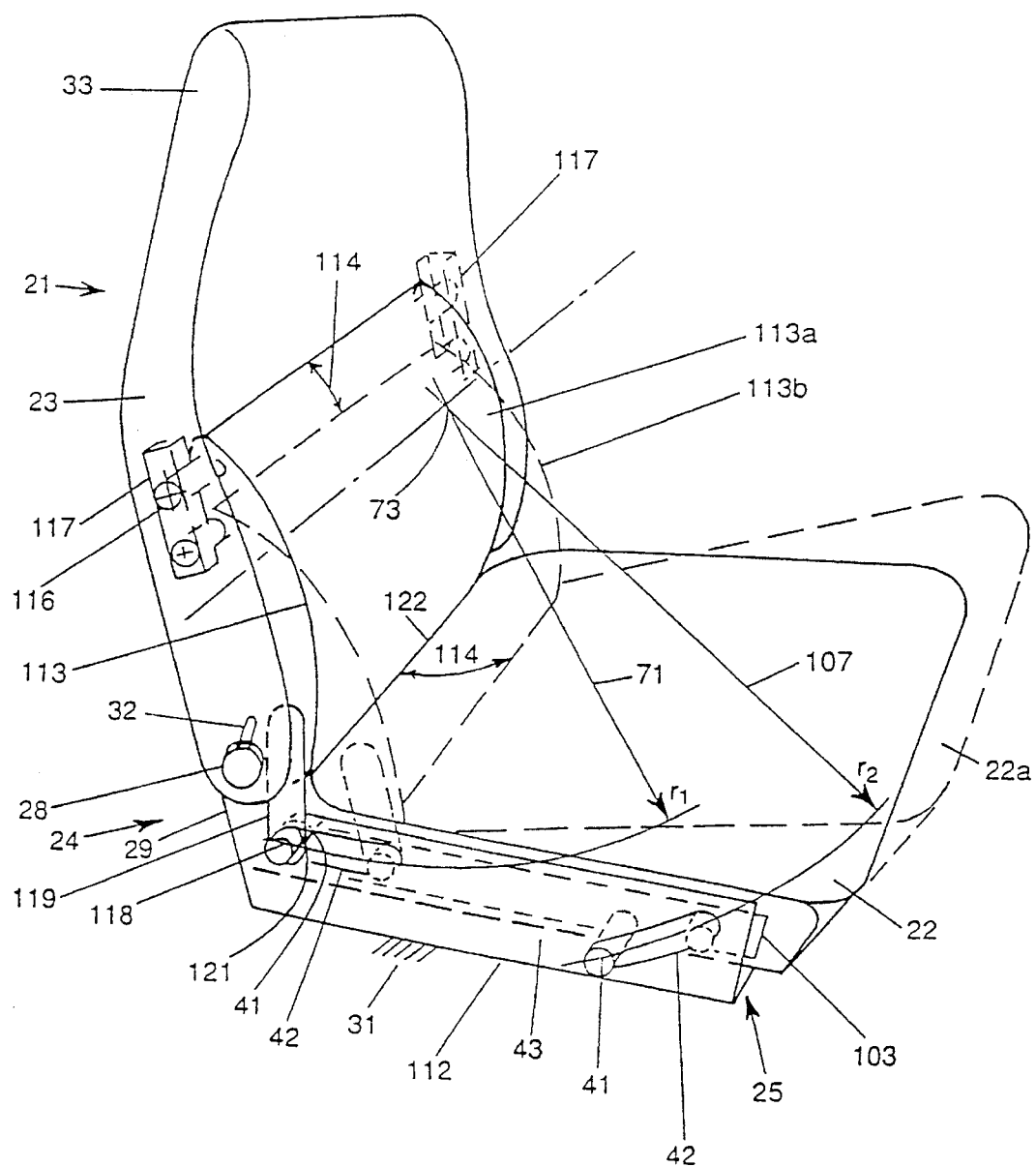
FIG. 1 is an isometric view of the seat and lumbar motion chair seat assembly constructed in accordance with the present invention.
Figure 2:
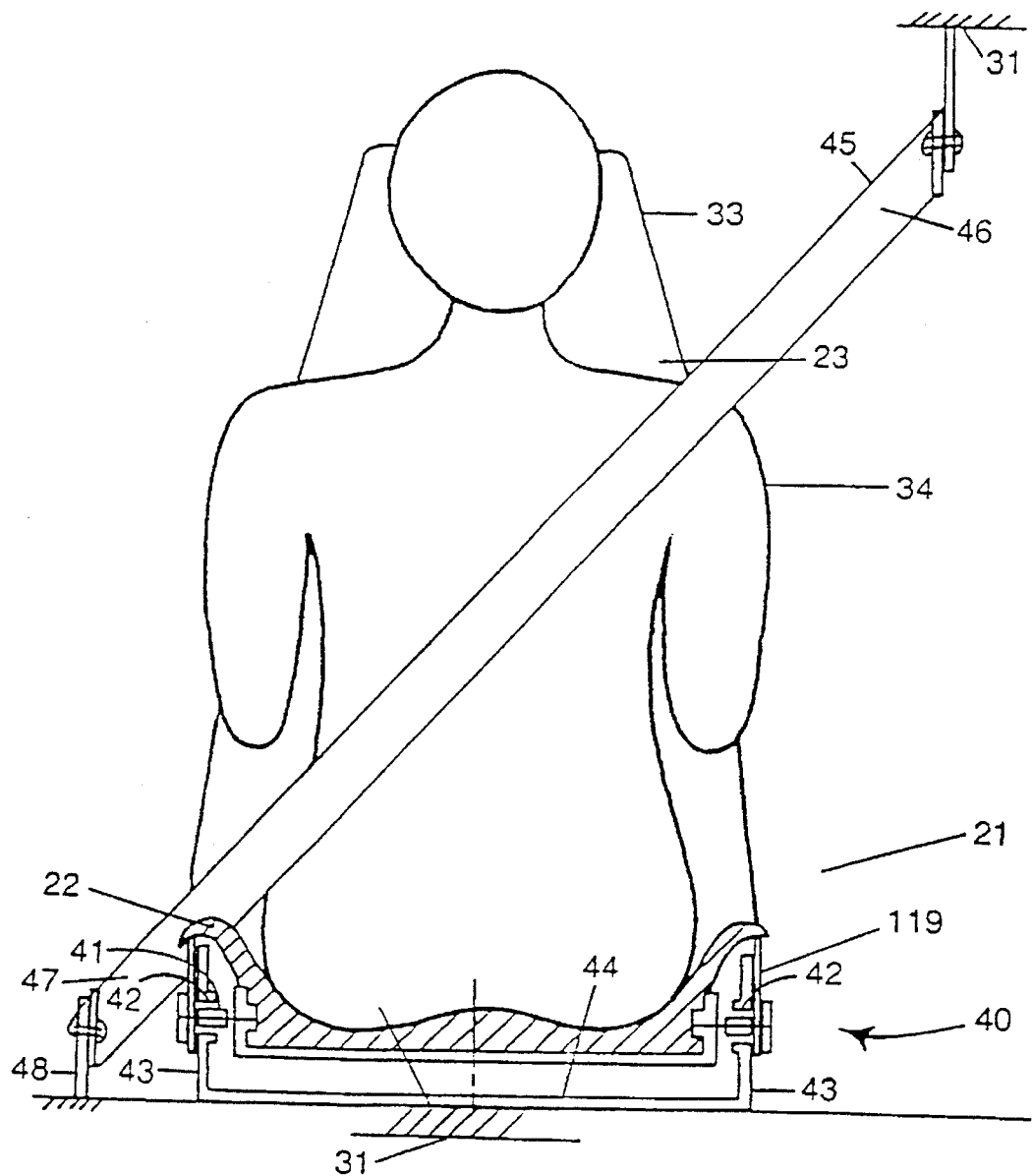
FIG. 2 is a front view of the seat assembly of FIG. 1, showing one form of the seat mounting assembly of the present invention.

In one aspect of the present invention a seat and lumbar motion chair assembly and method is provided which is particularly well suited for enhancing the safety and comfort of seated humans. FIGS. 1 and 2 illustrate one embodiment of the seat assembly which is particularly effective in affording the vehicle driver enhanced safety during frontal collisions.

The seat assembly of FIGS. 1 and 2, generally designed 21, the seat and lumbar motion chair, includes a seat 22 in its normal horizontal position and designated 22a in its deployed position tilted upwards, seat back 23 and mounting means, generally designated 25, for mounting seat 22 in a substantially horizontal position and mounting means 24 mounting back 23 in a substantially vertical position.

In the illustrated seat assembly, back mounting means 24 which is coupled to seat back 23 and is adjustably coupled at 28 to a mounting bracket 29 secured to mounting means 25 of the chair, which is schematically illustrated. The angle of seat back 23 is adjustable by lever 32 in a conventional manner, and the seat back preferably carries a head rest 33 positioned to engage the back of the head of a person 34 seated in the seat assembly. In the form of the back assembly shown in FIGS. 1 and 2. The back assembly and mounting means therefor, as illustrated in FIG. 1, however, does not constitute a novel portion of the seat assembly of the present invention.

Enhanced safety during panic stops or collisions is provided in the seat and lumbar assembly of the present invention.

Enhanced safety during panic stops or collisions is provided in the seat assembly of the present invention by the seat mounting means 25. In the form shown in FIGS. 1 and 2, seat 22 is mounted by laterally projecting seat mounting rods (or by roller elements) 41 positioned in upwardly concaved, arcuate slot 42 in seat frame member generally designated 40. As will be seen from FIG. 2, seat frame 40 may be a U-shaped frame with a central portion 44 and two upstanding side portions 43. Thus, seat 22 is guided for arcuate movement along the curve or arcuate path as defined by slots 42, which will be described in more detail hereinafter.

It is broadly known to provide a seat assembly with the seat mounted for movement along an upwardly concaved arcuate path, for example, as is shown in the seat assembly of my U.S. Pat. No. 4,650,249 and U.S. Pat. No. 5,244,252.

The new seating assembly of FIG. 1, further includes a lumbar support member 113 positioned to engage the back region of a person seated on seat 22. Moreover and very importantly, the back support 113 is movably mounted and coupled to the seat rear for movement in response to movement of seat 22. Thus, back support member 113 follows the change in position of the seated person's lumbar region as seat 22 moves along an upwardly tilting path.

In the preferred form, back support 113 is mounted for sliding movement, as indicated by arrow 114 by providing a transversely extending pivot rod member 116, which is slidably received in guide members 117 carried in back support means 23. As will be seen, guided movement of the lower back support member 113 will be provided.

Coupling of the back support member 113 for movement with seat 22 can be accomplished in various manners. As shown in FIG. 1, lower back support 113 is coupled for movement in response to seat 22 by rod means 118 and follower means 119. Rod 118 extends sideways of the seat and follower mounting plate 119 is provided extension from the lumbar support member 113. Formed in follower mounting plate 119 is an opening 121 dimensioned to pivotably receive the end of rod 118 which is extended from roller 41.

As seat 22 moves along the arcuate path indicated by arrow 71 and 107, rear end 122 of the seat is raised and lowered. This motion is transferred by the rod and follower assembly into reciprocal motion 114 of lumbar support member 113.

The seat assembly of FIG. 1, therefore, has the comfort and fatigue lessening advantages of a pelvic tilt seat, and additionally has the advantage that the back of the person seated on the seat will be continuously supported without the need for sliding or moving away from the person's back relative to the seat back. The seat back, instead, follows the lumbar region during movement of the seat.

In addition to providing support, significantly enhanced comfort and lessened fatigue, the seat of FIG. 1 also can be used in vehicles. The effect of this assembly is that the shifting of lumbar region 113, as seat 22 rotates to an upward position 22a as for example in a panic stop, it will tend to encourage displacement and rotation of the user's lower back, buttocks and legs while maintaining high frictional contact between the lumbar, buttocks and thighs and the chair during body motion.

The seat assembly of FIG. 1, therefore, has the comfort and fatigue lessening advantages of a pelvic tilt seat, and additionally has the advantage that the back of the person seated on the seat will be continuously supported without the need for sliding of the person's back relative to the seat back. The lumbar support 113, instead, follows the lumbar region during movement of the seat.

In the seat mounting means 25 of FIGS. 1 and 2, an arcuate path is provided in which there is a first radius $r_1$, as indicated by arrow 71, and a second radius $r_2$, as indicated by arrow 107. The radii $r_1$ and $r_2$ have coinciding centers of curvature in which the center 73 is located above 15" from the seat surface. In alternative constructions radii $r_1$ and $r_2$ can have separate centers 73, further centers 73 can be located below 15" down to 4" within the lumbar region of a person seated on said seat and further it can be located lower and even below the seat surface as will be shown in FIG. 3. This is formed to provide a smooth transition from one radius of curvature to the other and has advantages which will be described more fully hereinafter.

As is typical in many automobiles, a restraint device, such as in FIG. 2, a shoulder belt 45, may be provided proximate seat 21. Belt 45 has end 46 coupled to vehicle 31 proximate the roof or side wall and a lower end 47 coupled by a mounting flange 48 to the floor of vehicle 31

Figure 3:
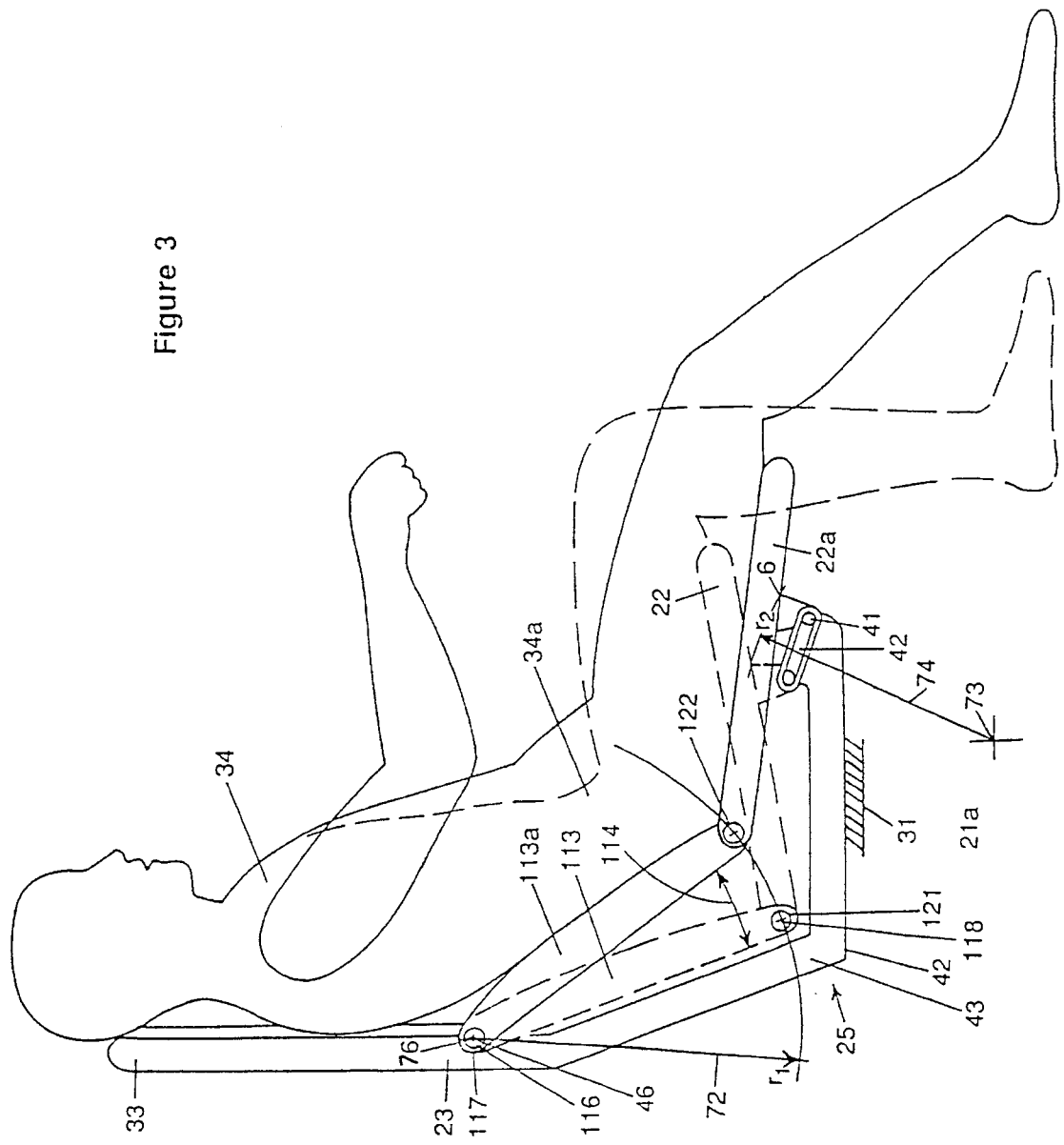
FIG. 3 is a side elevation view with an alternative path of motion of the seat and lumbar motion chair assembly of the present invention during normal seating illustrating a task seating posture.

In FIG. 3 the new seating assembly is formed with a lumbar support member 113 positioned to engage the back region of a person 34 seated on seat 22. Moreover and very importantly, the back support 113 is movably mounted and coupled for movement in response to movement of seat 22. In an alternative manner, the back support member 113 follows the change in position of the seated person's lumbar region as seat 22 moves along a "downwardly" tilting path.

In this assembly the lumbar support 113 is mounted for pivoting movement, as indicated by arrow 114 by providing a transversely extending pivot rod member 116, which is slidably received in guide members 117 carried fixedably in back support means 23. As will be appreciated, guided movement of the lower back support member 113 will be provided by seat 22 in an opposite manner of the assembly of FIG. 1.

Coupling of the back support member 113 for movement with seat 22 can be accomplished in various manners. As shown in FIG. 3, lower back support 113 is coupled for movement in response to movement of pivot pin or seat 22 by rod means 118 extending from seat 22 which is received by provided by an extension from the side of lumbar support member 113. Formed in follower mounting plate 119 is an opening 121 in lumbar support member 113 dimensioned to pivotably receive the end of rod 118.

As seat 22 moves along the arcuate path indicated by arrow 74 and 72, rear end 122 of the seat is raised and lowered. This motion is transferred by the rod and follower assembly into opposite reciprocal motion 114 of lumbar support member 113.

In addition to providing significantly enhanced comfort and lessened fatigue, the seat of FIG. 3 also can be used in many seating applications. The effect of the seat and lumbar motion chair of FIG. 3 is that the shifting of lumbar region 113, as seat 22 rotates to a downward position 22a lumbar support 113 will tend to encourage displacement and rotation of the user's 34 lower back, buttocks and legs to maintain high frictional contact between the lumbar, buttocks and thighs and the chair during body motion.

In the seat mounting means 25 of FIGS. 3, an arcuate path is provided in which there is a first radius $r_1$, as indicated by arrow 72, and a second radius $r_2$, as indicated by arrow 74. The radii $r_1$ has a center 76 in the center of rod member 116 which is above the seat and $r_2$ has a center of curvature in which the center 73 is located below the seat surface. In this construction radii $r_1$ and $r_2$ have separate centers 73 and 76, formed to provide a smooth transition from one radius of curvature to the other and has advantages such as full support of user 34 between the postures of (I) seated fully erect and (II) fully reclined, which will be described more fully hereinafter.

Figure 4:
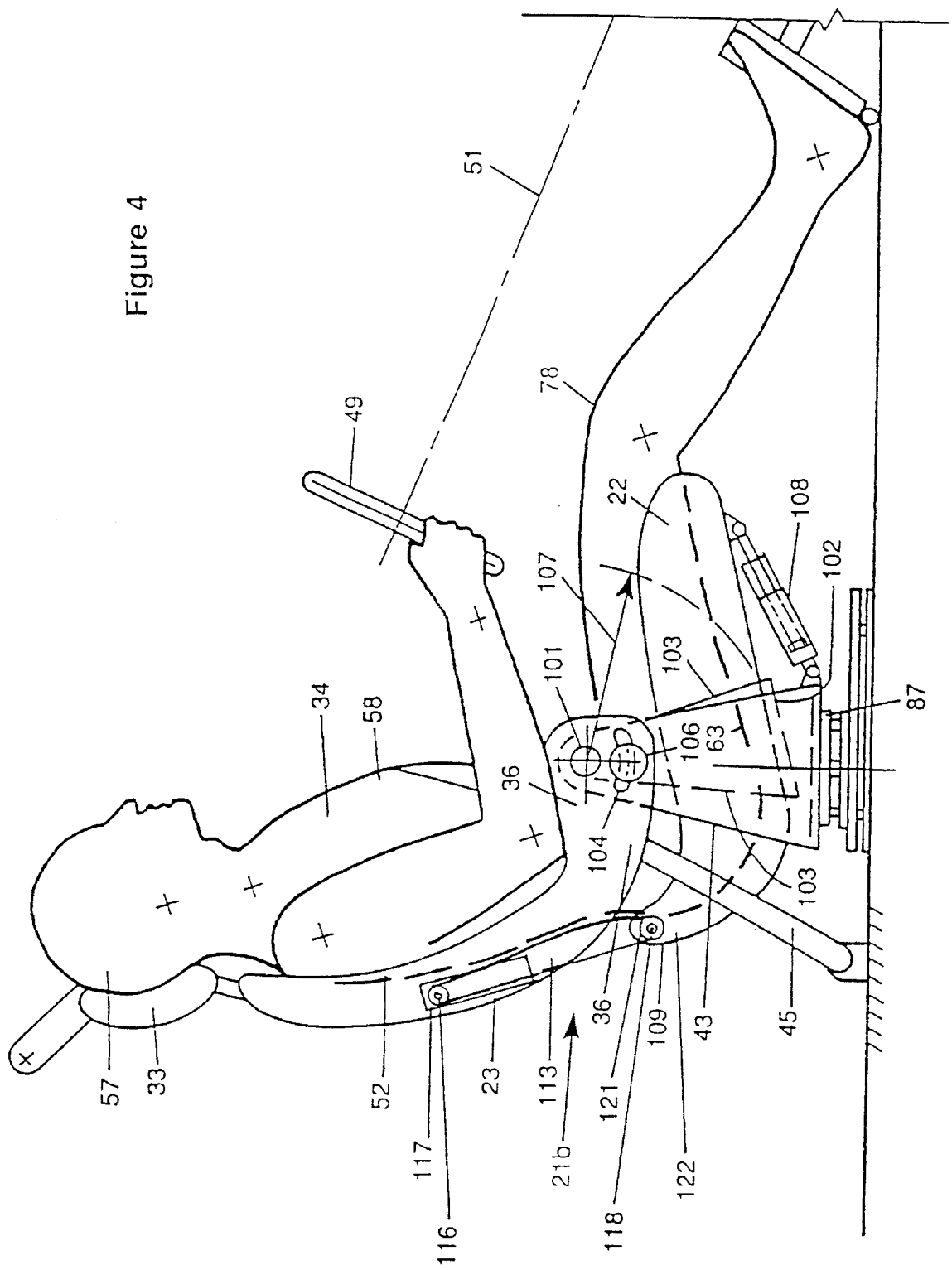
FIG. 4 is a side elevation view of an alternative construction showing the seat assembly of the present invention installed in a vehicle, further showing shock absorbing seat and lumbar support motion control means, further showing a U-shape frame mounting the assembly for rotation about a vertical axes.

In FIG. 4 the seat assembly 21b, seat 22 is mounted for movement along an upwardly concaved arcuate path by pivoting of the same about horizontally oriented, pivotal mounting pins 101, and a U-shaped frame having side seat support posts 43 provided. Posts 43 extend upwardly along opposite sides of seat 22 to a position above the seat, and preferably to about 10 or 11 inches above upper surface 63 of the seat so as to position pivot pins 101 at about the center of mass of the person's body. Seat 22 is carried by a seat pan member 102, which also is u-shaped and has sides 103 which extend up to pivot pins 101. In the preferred form, seat back 23 includes integral arm rest portions 36 which extend forwardly and are also mounted to posts 43. In the form illustrated, arm rests 36 also include a slot 104 and a locking knob assembly 106 that allows selective adjustment and locking of the angle at which seat back 23 is mounted with respect to support posts 43.

The operation of seat assembly 21b in a collision situation is similar to that of the previously described embodiments of the present invention and the assembly description of lumbar support 113 is the same as described in FIG. 1. Seat 22 rotates up along an upwardly concaved path about it's center of mass by pivot pin 101, as indicated by the radius arrow 107 in FIG. 4. The seat and lumbar assembly 21b with moveable lumbar support 113 provides an added mass which provides an added force to assist in overcoming the resistance of the lower back, pelvis, and thighs of person 34 to rotate counterclockwise during rapid deceleration. When considering that the center of mass of lumbar support 113 travels in a different path as compared to the center of mass of the seat in combination, the added mass of the lumbar support will affect the dynamic analysis and calculations and will yield unique equations of motion. Optionally, the seat assembly is also provided with control means 108 which is coupled between movable 22 and fixed frame member 43. Control means 108 can take the form of a spring-loaded piston, a pressurized cylinder with safety release valve which is releasable for movement at collision, or an electric solenoid which is used to modify the free swinging movement which would otherwise occur. Thus, means 108 could be coupled to an accelerometer and used to boost or accelerate seat rotation. It also could be coupled to the same airbag deployment device of the vehicle or to the vehicle's hydraulic system and used by the driver to control hydraulically the angle of the seat during normal operation, while being disengaged on a crash. Similar control means can be incorporated into the seat assemblies previously described.

Additionally, in the seat assembly of FIG. 4, seat 22 includes a rear portion 109 which extends around and engages the user's buttocks up to about the lower portion of the lumbar region of the back. As also will be seen, seat 22 extends along the sides of the user's thighs and buttocks to a greater degree than in previous embodiments.

Seat assembly 21b also includes pivotal mounting means 87 pivoting about a vertical access for easy entry and exit from the seat, in light of the arm rests 36.

In FIG. 4, the user 34 is shown in a normal seating position with his back 52 resting against seat back 23, lumbar support 113 and seat 22 in substantially the position shown in FIG. 1. The user's foot 53 is on the floor 31. The user's head 57 is proximate or rests against head rest 33, and shoulder belt 44 extends across the user's chest or torso 58.

The presence of passive restraint means, such as shoulder belt 44, causes the upper body or torso of the person to be restrained and decelerated with the vehicle while the mid and lower body move along the paths given by the seat and lumbar motion chair of the present invention.

There are several other effects which are highly advantageous and result from mounting seat 22 for movement along an upwardly concaved arcuate path oriented in a fore-aft direction in a vehicle. First rotation of seat 22 causes linear momentum of the lower body and legs of the driver or passenger to be converted into angular momentum during the deceleration process Second, the movement along the arcuate path includes forward movement so that the passenger has a greater distance over which to decelerate to a stop than the distance in which the vehicle was stopped. The rate of deceleration of the individual, therefore, is less than the rate of deceleration of the vehicle. Additionally and very importantly, as the seat rotates, the knees 78 are brought up to a position in front. This positioning of knees 79 is enhanced by the natural human reaction to lift the already slightly bent knees toward the chest when in a collision. Lastly and very importantly, the tendency for the body to be thrust up from seat 22 is greatly reduced since the counterclockwise rotation of seat 22 counteracts the clockwise rotation induced by the decelerating vehicle.

Figure 5:
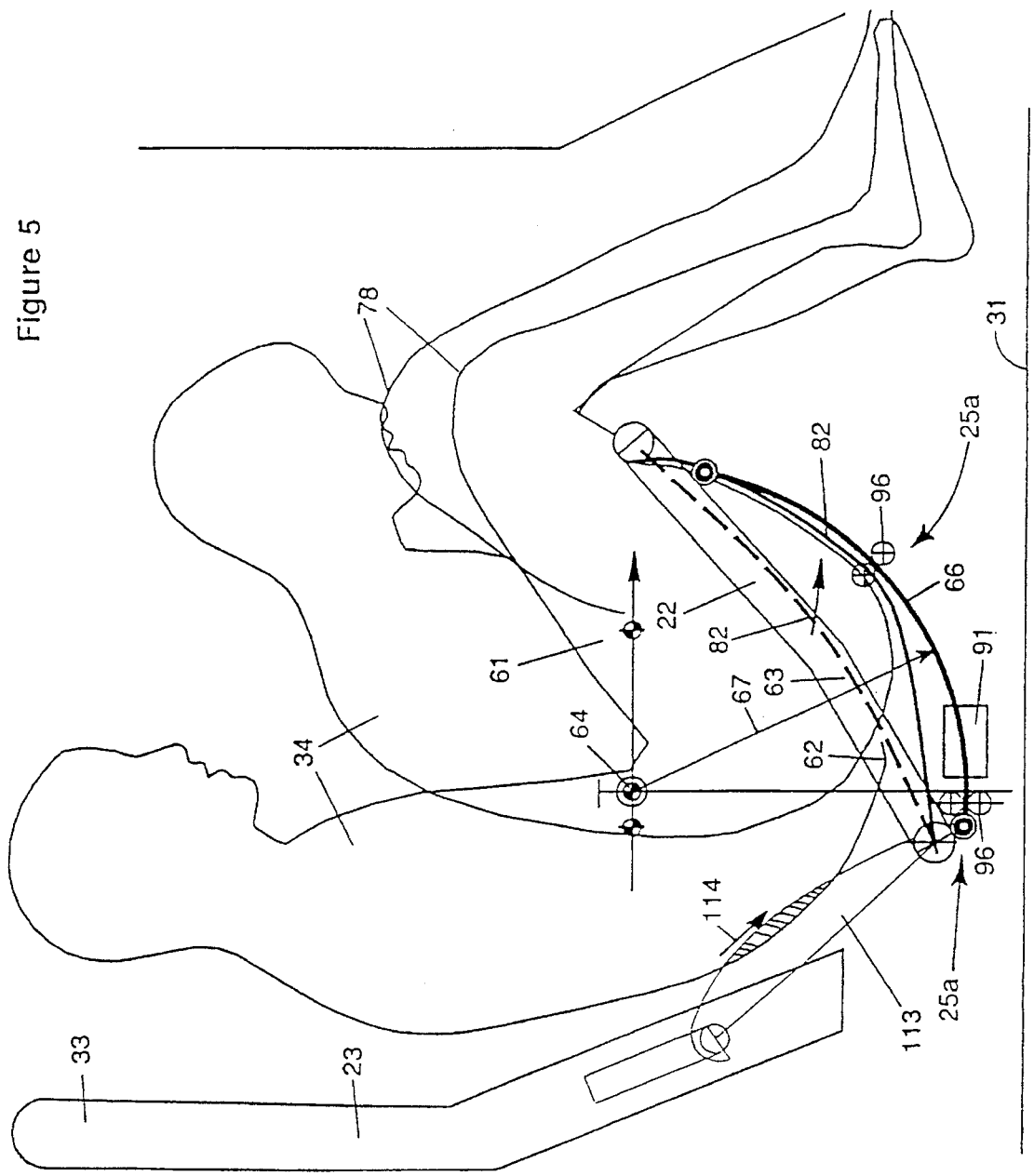
FIG. 5 is a side elevation view showing the seat and lumbar motion chair assembly of the present invention during a frontal collision of a vehicle, further including a lock/unlock control means to stop or release seat and lumbar support motion either at users will or automatically by momentum during collision.
Figure 6:
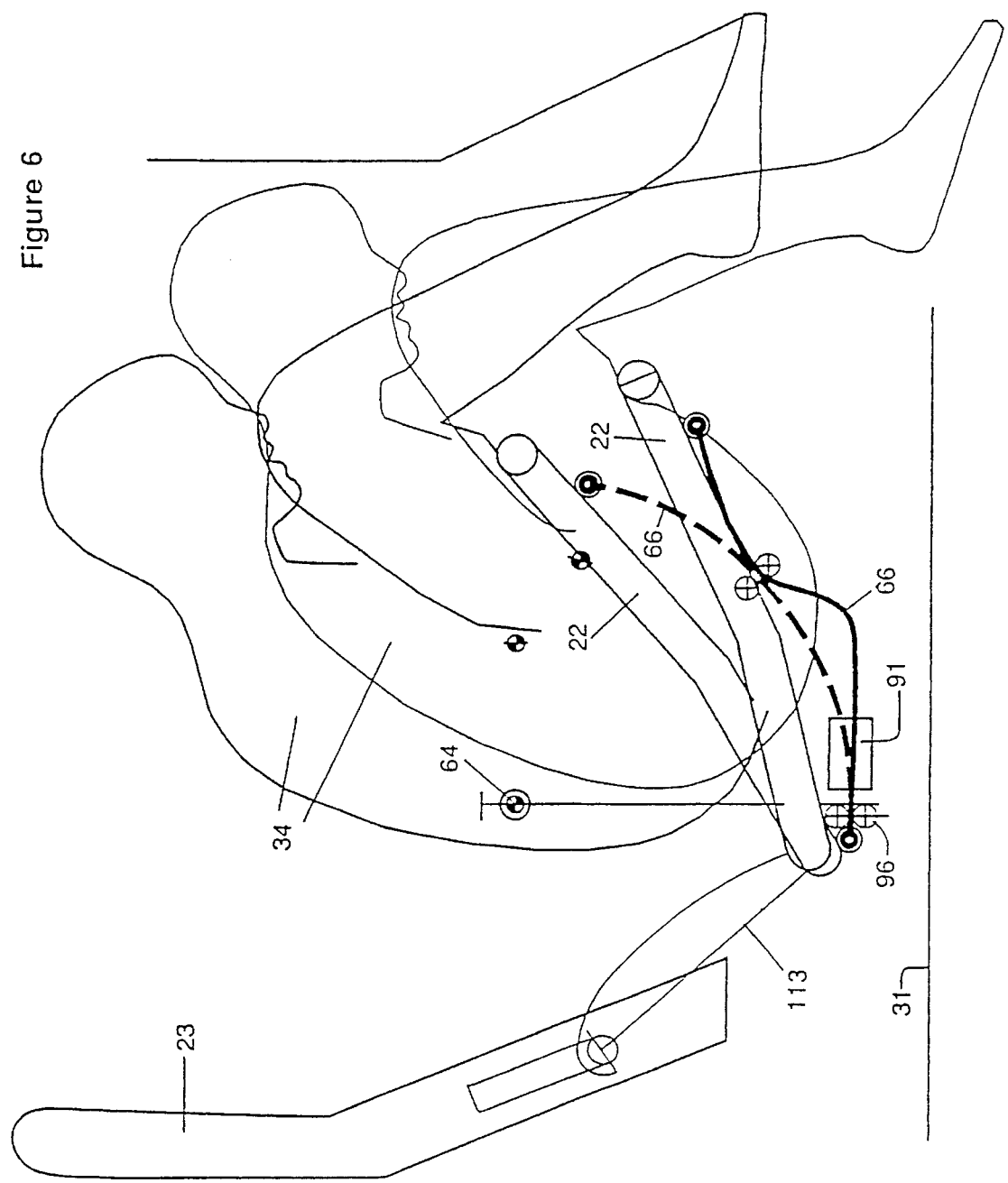
FIG. 6 is a side elevation view corresponding to FIG. 5 showing an embodiment thereof, including a seat with a deformable seat pan safety net.
Figure 7:
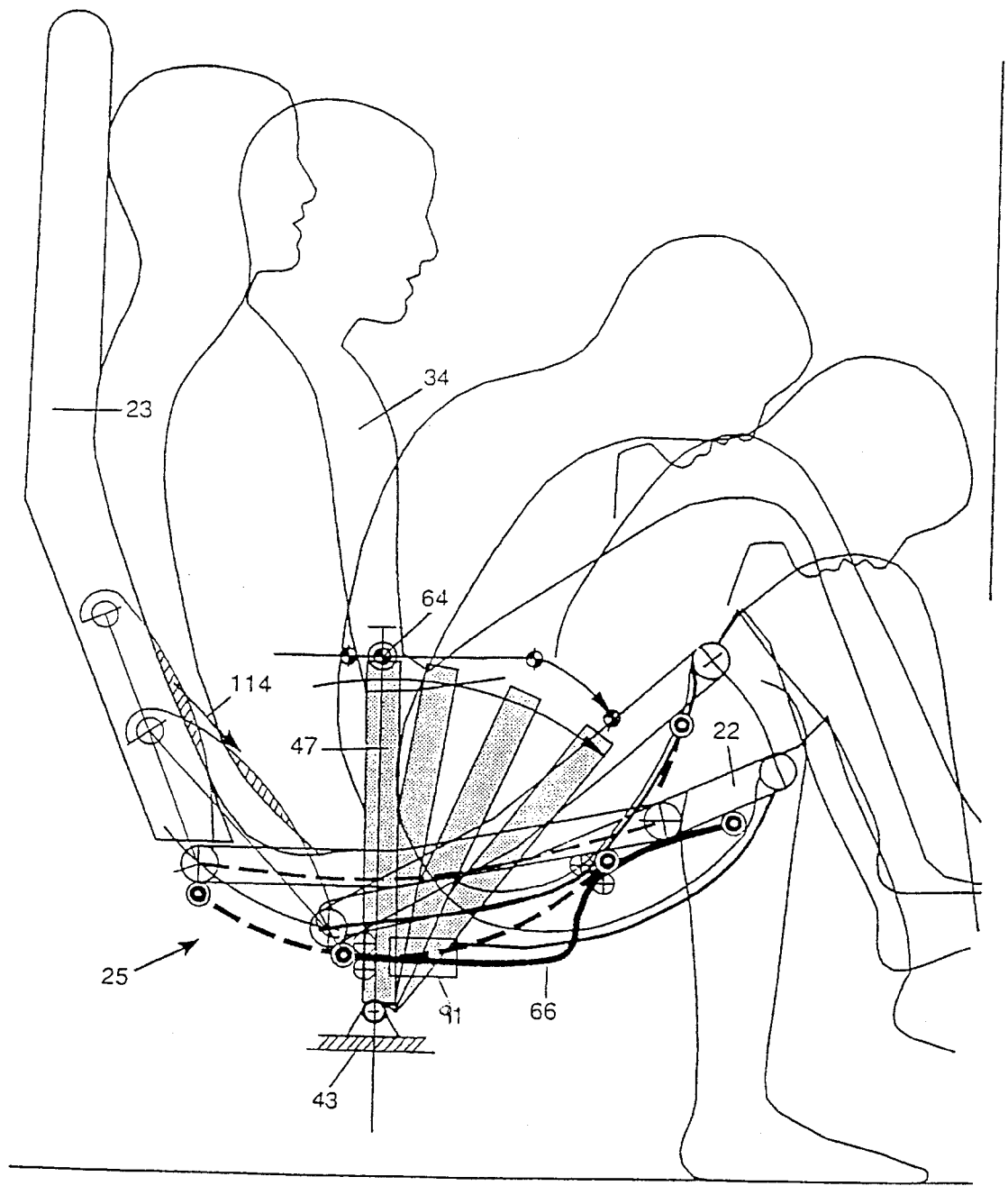
FIG. 7 is a side view of the seat and lumbar motion chair assembly corresponding to FIGS. 5 and 6 including mounting means that are deformable at a known threshold including a lap belt.

In FIG. 4 the shock absorber 108 will resiliently displace when full deployment as shown in FIGS. 5, 6, and 7 is reached, at which point the shock absorber is loaded and displaced downwardly with a resilient force equal to the body's ability to resist abdominal compression. It should also be noted that once the seat is repositioned to the position of FIG. 4, the resiliency of the seat also inherently affords a shock absorbing effect, which lengthens the time over which the lower body of the person seated on the seat is stopped.

In FIG. 5 the dynamics of the user 34 with the seat and lumbar motion chair of the present invention, which occur under a collision or extremely high rate of vehicle deceleration are illustrated similar to that of FIGS. 1 and 2, and the mounting means 25a, of FIG. 5 produces the same results as that of mounting means 25 in FIGS. 1, 2, and 4.

In the illustrated embodiment of FIG. 5 a pair of tracks 66 mounted laterally under seat 22 which moves is an arcuate path on rollers 96 having a center of curvature proximate center of mass 64. In FIG. 5 a single center of curvature is provided for track 66 and the curved path has one radius, r, as indicated by arrow 67.

When a frontal collision occurs in a vehicle having a conventional seat assembly, the friction between seat upper surface 63 and buttocks 62 and thighs 61 of the person in the seat rapidly drops to a very low value, and perhaps even zero if the user is lifted free of the seat. The dynamics of a frontal collision often are, therefore, to cause passenger 34 to simply be airborne toward the much more rapidly decelerating steering column, dashboard assembly and leg well of the vehicle. The result, of course, can be serious lower body injury or even death.

Seat assemblies of the present invention overcome this problem by using the seat 22 and lumbar support 113 paths of motion to maintain buttocks 62 and thighs 61 of the driver or passenger in contact with upper surface 63 of the seat when a frontal impact occurs. Seat 22, and lumbar support 113 rotates in a counterclockwise direction from the position of FIG. 4 and further of FIG. 5 to the position of FIG. 6.

As can be seen in FIG. 5, counterclockwise rotation of lumbar support 113 and seat 22 causes the lower body of user 34 to rotate counterclockwise as shown by arrow 114 and the front end of the seat to rise up in front of the user's thighs 61 in order to maintain contact between the lumbar 113, buttocks 62 and thighs 61 with upper surface 63 of the seat, to be effective in containing and decelerating the passenger's lower body and legs. The buttocks and thighs will be contained by the deformable seat pan 82, and accordingly there will be significant resistance to movement of the body in a forward direction relative to the rapidly decelerating vehicle by employing a membrane safety net 82 securely attached to perimeter frame of seat 22, deformable at a known threshold, said safety net 82 formed to contain the lower body's load by deflecting into a sack shape whereby the buttock bones become anchored to said seat safety net during a vehicle collision, to decelerate the mass of the user 34 safely while seat 22 is in it's fully deployed position.

The rate of deceleration of the individual, therefore, is less than the rate of deceleration of the vehicle. Additionally and very importantly, as the seat rotates, the knees 78 are brought up to a position in front of the dashboard assembly and yet behind steering column 51. This positioning of knees 78 is enhanced by the natural human reaction to position itself in a protective fetal posture. Lastly and very importantly, the tendency for the body to be thrust up from seat 22 is greatly reduced since the counterclockwise rotation of seat 22 counteracts the clockwise rotation of the decelerating vehicle.

In FIG. 6 another stage to the embodiment of FIG. 5 for absorbing crash energy is shown by the specific design of the laterally mounted pair of tracks 66 of seat 22. After the time of seat 22 and after full deflexion of safety net 82 and if at such time there is still sufficient crash energy left on seat mounting means of tracks 66 deformation at a known threshold will provide further resilient forward displacement of said seat whereby impact forces on the body do not exceed the body's ability to withstand abdominal pressure and muscular skeletal stress thus providing one more stage for absorbing remaining crash energy.

FIG. 7 illustrates a full sequence overlay of the embodiments of FIGS. 4,5, and 6 and further includes a lap belt 47 describing belt motion during a high deceleration crash impact event. The seat belt 47 is attached to the frame 43 of the chair under the seat proximately vertically under the center of motion of seat 22. It can be moved slightly back toward the rear considering that the point of application of the lap belt for the seat and lumbar motion chair of the present invention depends upon belt material elongation. Pelvic rotation must not be stopped during seat deployment period and buttock translation must be controlled by the deflexion rate of the seat pan 82.

Figure 8:
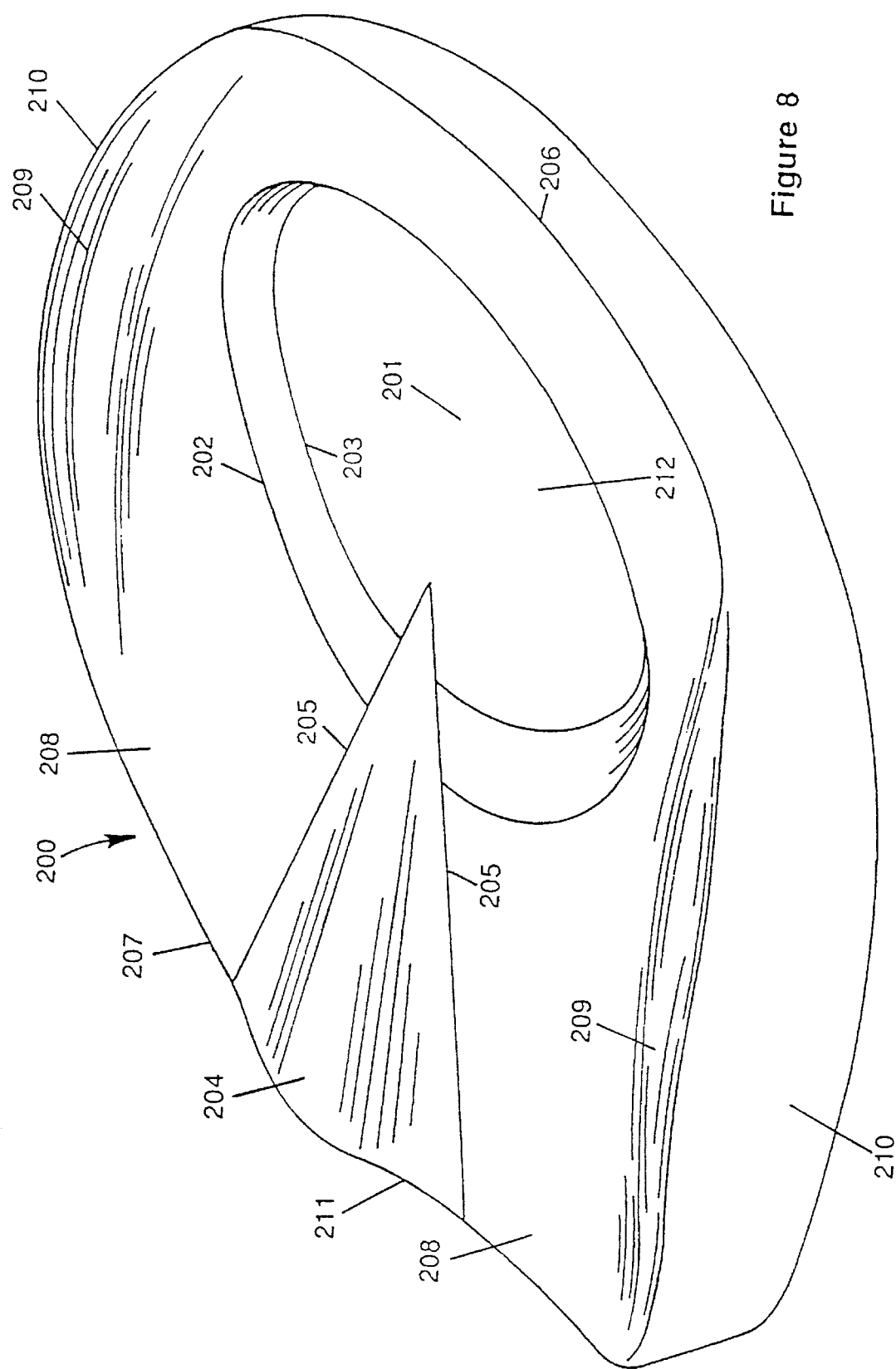
FIG. 8 is a isometric view of an embodiment of the seat pan, formed to include a pelvic cradle pocket

FIG. 8 illustrates a molded seat pan 200 to be utilized in any chair and more particular in the present seat and lumbar motion chair of the present invention. The contour of seat pan 200 is described as follows: Generally the distance between sides 210 is approximately 18", and the distance between front edge 211 and rear edge 206 is about 17". The seat pan has a buttock molded form with side bolsters 209 at each side and a concaved relief 208 at each side toward the front edge 211 to receive the shape of the thighs of a person. It further includes a pummel shape raised area 204 triangular in plant view with sides 205 as shown. However, the novel portion of seat pan 200 is a pelvic cradle pocket 212 in the form of an oval shape depression approximately 10" wide by 7" lengthwise along the seat as shown by perimeter 202 with a bottom 201 havin a perimeter 203 which is formed 1" to 1½ below the surface of the seat 200, pelvic cradle pocket 212 is located along the longitudinal center of seat 200 toward the rear.

In this manner the buttock bones known as the ischius tuberocities of a person seated on said seat are able to drop down in said pelvic cradle pocket in order to shift a portion the pressure of said buttock bones on the seat, to the muscle areas of the thighs, thus obtaining an improved buttock and thighs pressure distribution and a firmer grip of the body seated on said seat.

Figure 9:
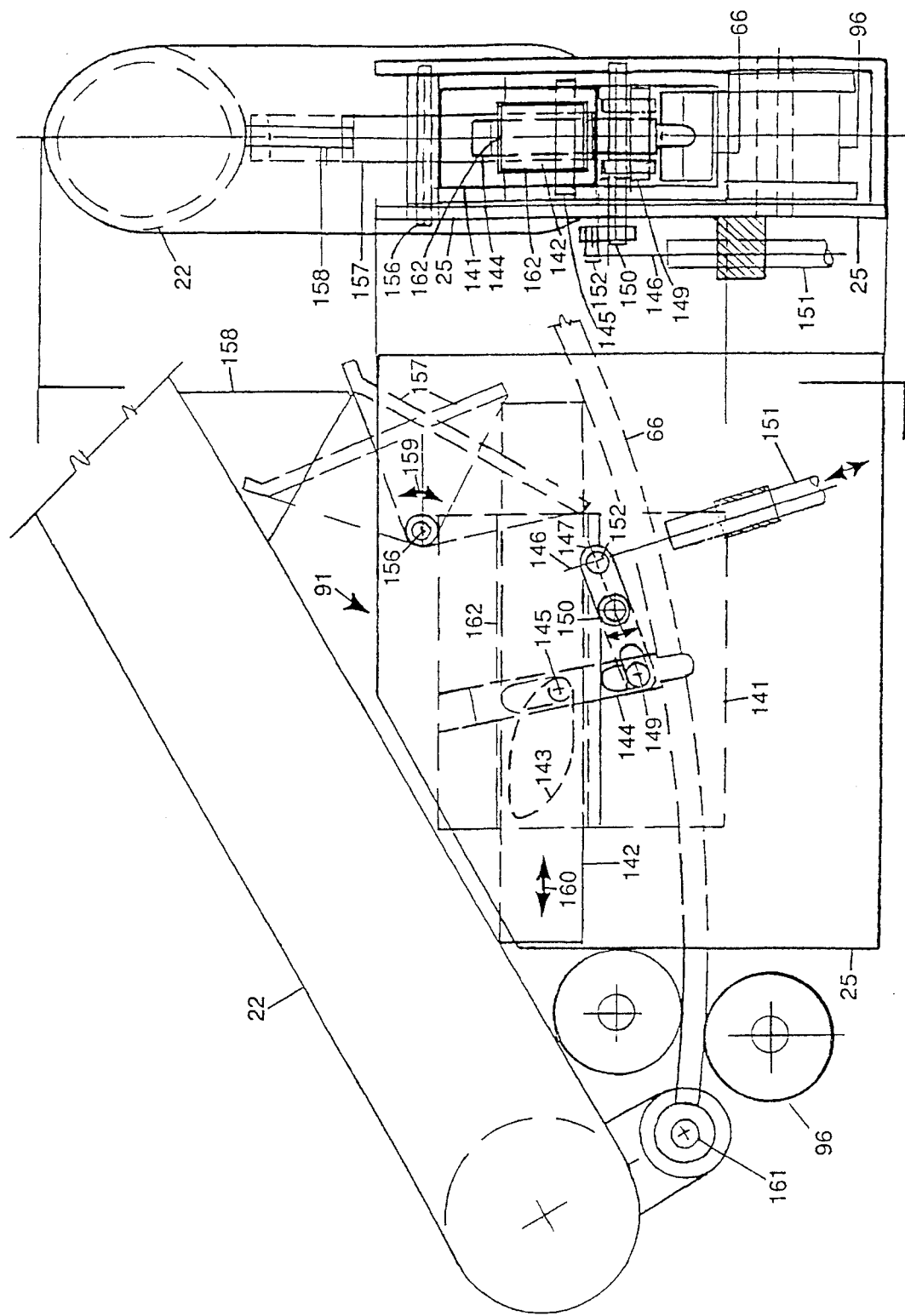
FIG. 9 is a schematic view of an embodiment of the control means for use with the present invention.

FIG. 9 a control means 91 as shown installed in FIGS. 5, 6 and 7 is disclosed taking the form of an inertia locking apparatus having a weighted slider 142 which slides fore and aft in the direction shown by arrow 160 which will slide forward upon impact, having a guiding slot cut out 143 which will lift pin 144 by push rod 145 upward. Rod 145 is fixedly connected to pin 144. Slider 142 rides freely on longitudinal slot 162 which is formed inside of block 141. Block 163 is fixedly connected to seat frame member 25. In this manner pin 144 locks upwardly curved track 66 to unlock the seat for motion.

At peak of impact deceleration seat 22 will reach it's full deployment angle of approximately 35°, therefore gasset plate 158 fixedly attached to seat 22 will hit trigger 157 which is pivotally mounted through pin 156 through seat frame 25 in the direction shown by arrow 159. At this point in time trigger 157 will hit weight 142 rearwardly which will push rod 145 downward by guiding slot 143 whereby pin 144 is pushed down through upwardly curved track 66 thereby locking the seat at it's steepest deployment angle in order to maintain the buttock anchor onto seat 22 and avoid a downward rotation of said seat during peak deceleration of said forces.

Further, a user actuated lock/unlock apparatus is added by flexible cable 146 which will actuate lever assembly 147 by pivot pin 152 which pivots about pin 150 thereby pushing pin 144 up or down by acting on pin 149 which is fixedly attached to pin 144 thereby locking and unlocking the seat at the user's will.

What is claimed is:

1. A seat and lumbar motion chair assembly comprising: a back support; back support mounting assembly coupled to said back support and mounting said back support in a stationary position in a generally vertical orientation relative to a support surface; a seat; seat mounting assembly coupled to said seat and mounting said seat to said mounting assembly proximate said back support in a generally horizontal orientation relative to said support surface for guided fore and aft movement of said seat along a continuous arcuate path; and a lumbar support coupled proximate its lower end to said seat for movement of said lower end of said lumbar support in said fore and aft movement with said seat, said lumbar support being pivotally coupled proximate its top end to said back support said back support remaining in its stationary position during movement of said lumbar support, whereby a buttocks and lumbar region of a user seated in said chair assembly will remain supported in substantial contact with both said seat and said lumbar support during rapid fore and aft motion of said seat.

2. A seat and lumbar motion chair assembly as defined in claim 1 wherein,
said top end of said lumbar support is coupled to about mid height of said back support by a mounting assembly formed for both pivotal motion and vertical sliding displacement of said top end.

3. A seat and lumbar motion chair as defined in claim 1 wherein,
said back support mounting assembly and said seat mounting assembly are formed to mount said seat in a vehicle, said seat mounting assembly being further formed for mounting said seat for movement along an upwardly concaved arcuate path having a radius of curvature maintaining significant frictional contact between said seat and a buttocks of a person seated on said seat and between said lumbar support and a lower back of the person seated on said seat during stopping of forward motion of the vehicle at a high rate of deceleration.

4. A seat and lumbar motion chair assembly as defined in claim 1 wherein,
back support mounting assembly and said seat mounting assembly are both formed to mount chair assembly in a vehicle, and said seat mounting assembly is formed to mount said seat for movement along an upwardly arcuate path having a radius of curvature selected to be sufficiently large to allow said seat to move forward to a position in front of the buttocks of a person seated on said seat and sufficiently small to convert a portion of linear momentum of a person's lower back and buttocks during movement with said seat into angular momentum.

5. A seat and lumbar motion chair assembly as defined in claim 4 wherein,
said seat mounting assembly mounts said seat for movement along an arcuate path having a radius of curvature resisting submarining of a person's legs and torso relative to a passenger restraining means provided in the vehicle proximate said seat.

6. A seat and lumbar motion chair assembly as defined in claim 1 wherein,
said seat mounting assembly mounts said seat and lumbar support for substantially unrestrained movement along said arcuate path.

7. A seat and lumbar motion chair assembly as defined in claim 1 wherein,
said seat mounting assembly mounts said seat for movement along an upwardly concaved path defined by a plurality of radii of curvature having centers of curvature positioned to provide a smooth path.

8. A seating apparatus for humans comprising:
a. a seat;
b. a seat mounting assembly mounting said seat in a near horizontal orientation relative to a support surface for a movement of said seat along an upwardly arcuate path;
c. a back support mounted in a stationary generally vertical orientation proximate said seat; and
d. a lumbar support pivotally mounted to said back support proximate one end of said lumbar support and coupled to said seat proximate another end of said lumbar support for movement of said another end in a fore and aft direction and pivoting of said one end in response to movement of said seat in a fore and aft direction along said path said back support remaining in its stationary vertical orientation during movement of said lumbar support.

9. The seating apparatus as defined in claim 8 wherein,
said lumbar support is mounted to said back support by a vertically extending frame assembly formed for both vertical sliding and pivoting of said one end relative said back support.

10. A method of reducing injury to a person seated in a seat of a vehicle during stopping of said vehicle at a high rate of deceleration comprising the steps of:
mounting a seat in said vehicle for movement in a direction oriented substantially parallel to a fore-aft axis of said vehicle along an upwardly arcuate path mounting a back support in a stationary, near vertical orientation proximate said seat;
pivotally coupling an upper portion of a lumbar support member to said support; and coupling a lower portion of said lumbar support member to said seat for movement with said seat.

11. The method as defined in claim 10 wherein, said step of mounting said seat is accomplished by mounting said seat and said lower portion of said lumbar support for movement along an upwardly arcuate path having a center of curvature located below the head of a person seated on said seat.

12. The method as defined in claim 10, and the step of mounting a passenger restraining means proximate said seat; and said step of mounting said seat is accomplished by mounting said seat for movement along an arcuate path maintaining contact of a person's lumbar and buttocks with said lumbar support member and said seat to substantially prevent submarining of a person's torso and legs relative to said seat and said lumbar support member.

13. The method as defined in claim 10 wherein, said step of mounting said seat is accomplished by mounting said seat for pivotal movement.

14. The method as defined in claim 10 wherein, said step of mounting said seat is accomplished by mounting said seat along an upwardly concaved arcuate path having a center of curvature proximate a center of mass of a person seated on said seat.

\* \* \* \* \*

UNITED STATES PATENT AND TRADEMARK OFFICE
CERTIFICATE OF CORRECTION

PATENT NO. : 5,558,399

DATED : September 24, 1996

INVENTOR(S) : Serber

It is certified that error appears in the above-indentified patent and that said Letters Patent is hereby corrected as shown below:

Column 1, line 15, delete "witch" and insert therefor
--with--.

Column 1, line 33, delete "legs and" and insert therefor
--legs; and--.

Column 7, line 20, delete ""downwardly"" and insert therefor
-- ""downwardly""--.

Column 7, line 32-33, delete "of pivot pin or seat 22 by rod means" and insert therefor
--of seat 22 by pivot pin or rod means"--.

Column 9, line 12, delete "79" and insert therefor
--78--.

Signed and Sealed this

Twenty-fifth Day of March, 1997

Attest:

BRUCE LEHMAN

Attesting Officer

Commissioner of Patents and Trademarks